(12) United States Patent
Johnson (10) Patent No.: US 9,813,119 B1
(45) Date of Patent: Nov. 7, 2017

(54) PASSIVE WIRELESS ACCESSORY SWITCH PACK

(71) Applicant: Harley-Davidson Motor Company Group, LLC, Milwaukee, WI (US)

(72) Inventor: Mike Johnson, Milwaukee, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 0 days.

(21) Appl. No.: 15/287,456

(22) Filed: Oct. 6, 2016

(51) Int. Cl.
*H04B 5/00* (2006.01)
*H04B 7/00* (2006.01)

(52) U.S. Cl.
CPC ......... *H04B 5/0087* (2013.01); *H04B 5/0031* (2013.01)

(58) Field of Classification Search
CPC .................................... H04B 5/0087
USPC ............................... 455/41.1, 41.2
See application file for complete search history.

(56) References Cited

U.S. PATENT DOCUMENTS

| | | | |
|---|---|---|---|
| 5,704,707 A | 1/1998 | Gebelein et al. | |
| 5,856,710 A | 1/1999 | Baughman et al. | |
| 6,154,635 A * | 11/2000 | Ohta ..................... | G06K 7/0008 340/10.4 |
| 6,311,052 B1 | 10/2001 | Lenz | |
| 6,512,974 B2 | 1/2003 | Houston et al. | |
| 6,937,149 B2 | 8/2005 | McMahon | |
| 6,978,162 B2 | 12/2005 | Russell et al. | |
| 6,982,633 B2 | 1/2006 | Burdick | |
| 7,062,301 B1 | 6/2006 | Dieringer | |
| 7,203,525 B2 | 4/2007 | Dieringer | |
| 7,468,667 B2 | 12/2008 | Moffett | |
| 7,504,983 B2 | 3/2009 | Chene et al. | |
| 7,620,419 B1 | 11/2009 | Gandolfo | |
| 7,804,886 B2 | 9/2010 | Silver et al. | |
| 8,073,496 B2 | 12/2011 | Kim et al. | |
| 8,177,182 B1 | 5/2012 | Wood et al. | |
| 8,572,489 B2 | 10/2013 | Millington et al. | |

(Continued)

FOREIGN PATENT DOCUMENTS

| EP | 1374707 | 1/2004 |
|---|---|---|
| EP | 1461870 | 9/2004 |

(Continued)

*Primary Examiner* — Tilahun B Gesesse
(74) *Attorney, Agent, or Firm* — Michael Best & Friedrich LLP (57) ABSTRACT

A switch pack for a vehicle and systems comprising the same. One system includes the switch pack and a control unit mechanically coupled to the vehicle. The control unit includes a first antenna coil electrically coupled to an electrical system of the vehicle. The first antenna coil receives a current from the electrical system and produces a magnetic field. The switch pack includes a second antenna coil, at least one user-actuated device, and a wireless transmitter electrically coupled to the second antenna coil. The second antenna coil is positioned within the magnetic field and receives an induced current from the magnetic field. The wireless transmitter receives the induced electrical current from the second antenna, uses the induced electrical current to determine a state of the at least one user-actuated device, and uses the induced electrical current to wirelessly transmit the state of the at least one user-actuated device.

20 Claims, 4 Drawing Sheets

(56) References Cited

U.S. PATENT DOCUMENTS

| | | | |
|---|---|---|---|
| 8,892,055 B2* | 11/2014 | Gasperi | H04B 5/0031 |
| | | | 307/104 |
| 9,159,221 B1 | 10/2015 | Stantchev | |
| 9,207,664 B2* | 12/2015 | Wielebski | G05B 19/409 |
| 2002/0068605 A1 | 6/2002 | Stanley | |
| 2005/0115761 A1 | 6/2005 | Dinda et al. | |
| 2007/0013545 A1* | 1/2007 | Tippelt | B60R 16/027 |
| | | | 340/12.22 |
| 2009/0085766 A1 | 4/2009 | Seydoux et al. | |
| 2010/0253501 A1 | 10/2010 | Gibson | |
| 2012/0028682 A1 | 2/2012 | Danne | |
| 2013/0093585 A1 | 4/2013 | Ambani | |
| 2014/0104055 A1 | 4/2014 | Boutte | |
| 2014/0154989 A1 | 6/2014 | Lane | |
| 2014/0370803 A1* | 12/2014 | Haverinen | H04B 5/0031 |
| | | | 455/41.1 |
| 2015/0054760 A1 | 2/2015 | Amaru et al. | |

FOREIGN PATENT DOCUMENTS

| | | |
|---|---|---|
| EP | 1746910 | 1/2007 |
| EP | 2302815 | 3/2011 |
| GB | 2485804 | 5/2012 |
| WO | 2014134148 | 9/2014 |

\* cited by examiner

PASSIVE WIRELESS ACCESSORY SWITCH PACK

FIELD

Embodiments of the present invention relate to wireless switch packs for a vehicle, such as a motorcycle.

BACKGROUND

Adding new electrical functions to a vehicle often requires the addition of user-actuated devices, such as switches or buttons, to the vehicle that allow an operator of the vehicle to control the new functions. To add a user-actuated device to a motorcycle, the user-actuated device commonly is hard-wired to an electrical system of the motorcycle. Hard-wiring the device, however, is difficult given wire routing concerns and weather-proofing. Furthermore, even if a motorcycle is equipped with an electrical connection or port for removably receiving an additional user-actuated device, the electrical connection is subject to weather conditions and safety considerations both when a device is coupled to the electrical connection and when no device is coupled to the electrical connection. In addition, although an internal power source, such as a battery, may be used to power an additional user-actuated device to eliminate some electrical wiring, the internal power source has a limited life, which limits the life of the device.

SUMMARY

Accordingly, embodiments of the invention provide a wireless accessory switch pack including at least one user-actuated device (for example, buttons, switches, toggles, dials, and the like) that does not require wiring the pack to the vehicle. As described in more detail below, the accessory switch pack wirelessly receives power from another component electrically coupled to the vehicle and, using the received power, wirelessly transmits data associated with the at least one user-actuated device. For example, in some embodiments, the accessory switch pack receives power from another component electrically coupled to the vehicle using near field communication (NFC), radio frequency identification (RFID), inductive coupling, or other wireless techniques. Thus, the accessory switch pack makes it easy to add additional user-actuated devices to a vehicle without requiring any wiring. Therefore, operators of vehicles can easily and quickly add user-actuated devices to a vehicle.

For example, one embodiment of the invention provides a system for a vehicle that includes a switch pack and a control unit mechanically coupled to the vehicle. The control unit includes a first antenna coil electrically coupled to an electrical system of the vehicle. The first antenna coil receives a current from the electrical system and produces a magnetic field. The switch pack includes a second antenna coil, at least one user-actuated device, and a wireless transmitter electrically coupled to the second antenna coil. The second antenna coil is positioned within the magnetic field and receives an induced current from the magnetic field. The wireless transmitter is configured to receive the induced electrical current from the second antenna, use the induced electrical current to determine a state of the at least one user-actuated device, and use the induced electrical current to wirelessly transmit the state of the at least one user-actuated device.

Another embodiment of the invention provides a switch pack for a vehicle. The switch pack includes a first antenna coil, at least one user-actuated device, and a wireless transmitter electrically coupled to the first antenna coil. The first antenna coil is positioned within a magnetic field produced by a second antenna coil electrically coupled to an electrical system of the vehicle and receives an induced electrical current from the magnetic field. The wireless transmitter is configured to receive the induced electrical current from the first antenna coil, use the induced electrical current to determine a state of the at least one user-actuated device, and use the induced electrical current to wirelessly transmit the state of the at least one user-actuated device.

Yet a further embodiment of the invention provides a method of controlling a function through a user-actuated device included in a switch pack. The method includes positioning a first antenna coil included in the switch pack in a magnetic field generated by a second antenna coil electrically coupled to an electrical system of a vehicle. The first antenna coil receives an induced electrical current based on the magnetic field and powers a wireless transmitter with the induced electrical current. The wireless transmitter determines a state of the user-actuated device and transmits the state of the user-actuated device.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "predetermined" means specified prior to an event. Also, electronic communications and notifications may be performed using any known means including direct connections (e.g., wired or optical), wireless connections, or other communication.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention.

Figure 1:
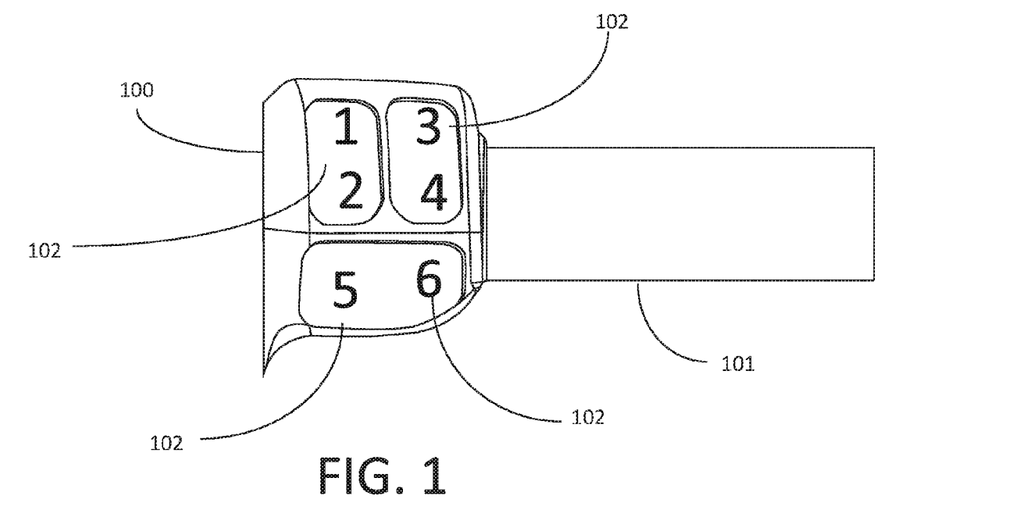
FIG. 1 illustrates a hand control unit mounted in a vehicle.

FIG. 1 illustrates a hand control unit 100 mounted in a vehicle. In the example illustrated in FIG. 1, the hand control unit 100 is mounted on a handlebar 101 of a motorcycle. However, it should be understood that the hand control unit 100 may be mounted at other locations on the motorcycle and may also be mounted in a vehicle different from a motorcycle, such as a passenger vehicle, an off-road vehicle, a commercial vehicle, and the like.

As illustrated in FIG. 1, the hand control unit 100 includes one or more user-actuated devices 102, such as one or more buttons, switches, toggles, dials, or a combination thereof. Each user-actuated device 102 may control one or more aspects of the vehicle, including, for example, turning on and off fans, locks, turn indictors, windshield wipers, cruise control, ignition, headlights, and the like. The hand control unit 100 is mechanically coupled to the vehicle (for example, the handlebar 101) using one or more mounting mechanisms, such as screws, clips, adhesives, rivets, and the like. The hand control unit 100 is also electrically coupled to an electrical system of the vehicle through wiring. The electrical system of the vehicle is powered by one or more power sources included in the vehicle. For example, a battery included in the vehicle may provide electrical power to the electrical system. Optionally, the electrical system may receive electrical power generated from operation of an internal combustion engine included in the vehicle (for example, through an alternator). For example, when the hand control unit 100 is mounted on the handlebar 101, the hand control unit 100 is electrically coupled to wiring running through the handlebar coupled to an electrical system of the vehicle. As described in more detail below, the hand control unit 100 may also communicate with a communication system of the vehicle, such as a controller area network (CAN) bus of the vehicle. The hand control unit 100 may communicate a state of one or more of the user-actuated devices 102 to other vehicle components over the CAN bus. Alternatively or in addition, the hand control unit 100 may communicate a state of one or more of the user-actuated devices 102 directly to another vehicle component over a wired or wireless connection. For example, in some embodiments, the hand control unit 100 includes a wireless transmitter, such as a Bluetooth transmitter, that transmits a state of one of the user-actuated devices 102 to a wireless receiver included in the vehicle or external to the vehicle.

Figure 2:
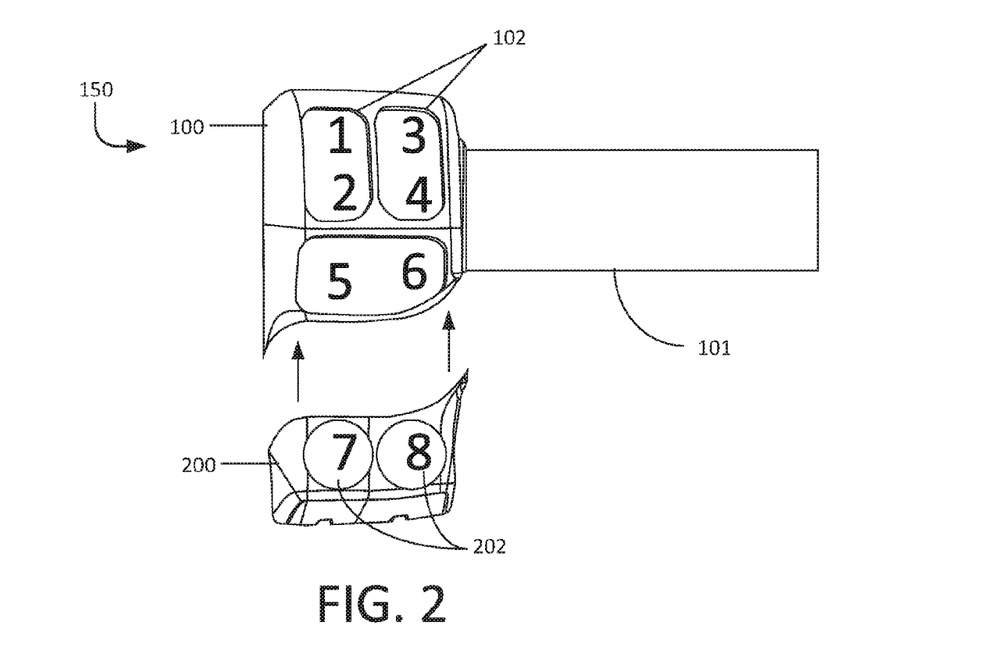
FIG. 2 illustrates the hand control unit of FIG. 1 and an accessory switch pack forming a switch system mounted in a vehicle according to one embodiment of the invention.

FIG. 2 illustrates a switch system 150 mounted in a vehicle. The switch system 150 includes the hand control unit 100 and an accessory switch pack 200. Similar to the hand control unit 100, the accessory switch pack 200 includes one or more user-actuated devices 202. As described above for the hand control unit 100, the user-actuated devices 202 may include one or more buttons, switches, toggles, dials, or a combination thereof, and each user-actuated device 202 may control one or more aspects of the vehicle, including, for example, turning on and off fans, locks, directional lights, windshield wipers, cruise control, ignition, headlights, and the like. In some embodiments, one or more of the user-actuated devices 202 controls non-vehicle functions, such as controlling a cellular phone, controlling a media player, or controlling a navigation device. In some embodiments, the accessory switch pack 200 is mechanically coupled to vehicle (for example, the handlebar 101, the hand control unit 100, or both) using one or more mounting mechanisms, such as screws, clips, adhesives, rivets, and the like. Alternatively, in some embodiments, the accessory switch pack 200 is not mechanically mounted to the vehicle but is carried by an operator or passenger of the vehicle or is supported by a surface or compartment of the vehicle. As described in more detail below, the accessory switch pack 200 is not coupled to the vehicle using any type of physical wiring for receiving power or transmitting data.

Figure 3:
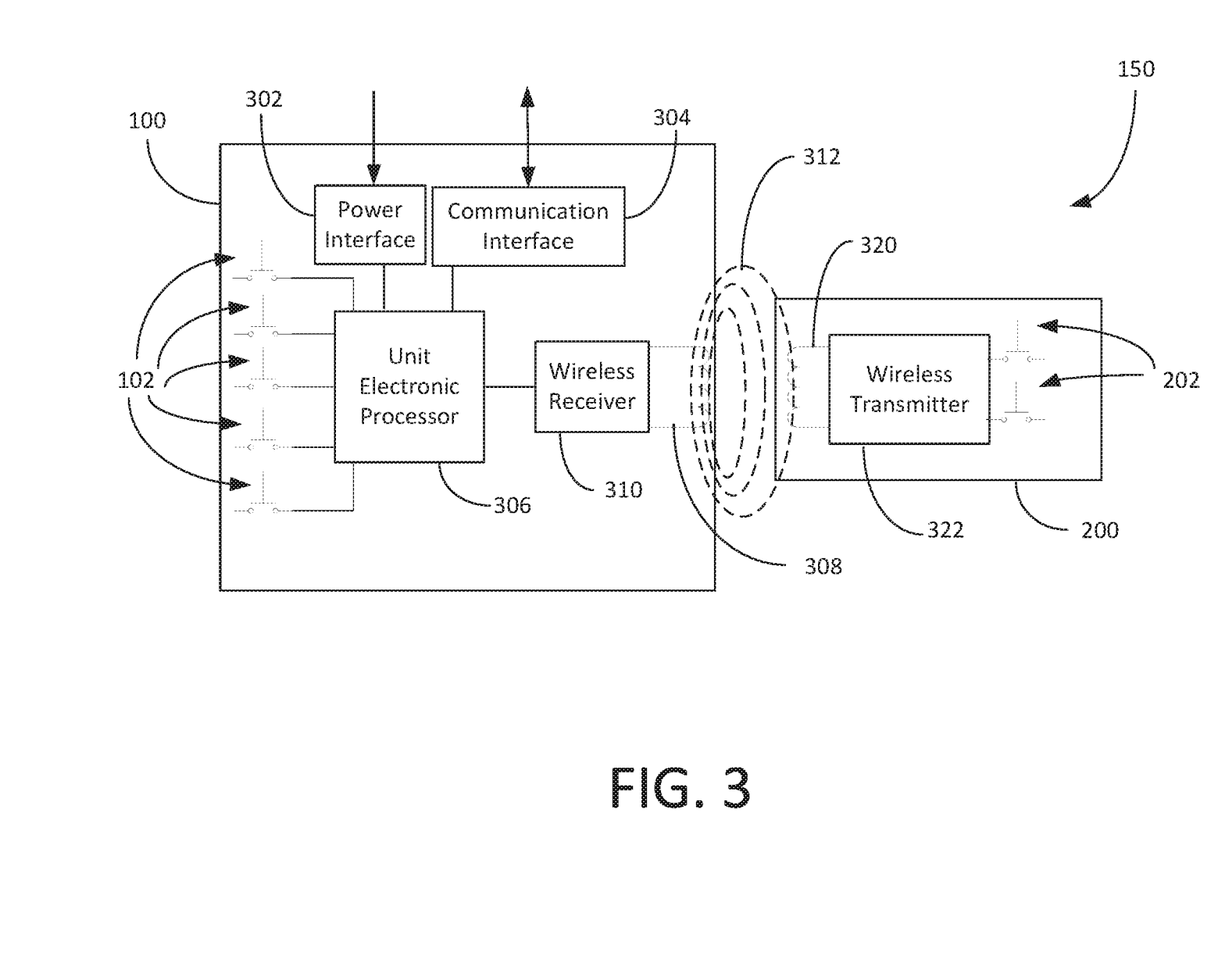
FIG. 3 schematically illustrates the switch system of FIG. 2 according to one embodiment of the invention.

FIG. 3 schematically illustrates the switch system 150 of FIG. 2. As illustrated in FIG. 3, switch system 150 includes the hand control unit 100, which includes the one or more user-actuated devices 102. As illustrated in FIG. 3, the hand control unit 100 also includes a power interface 302, a communication interface 304, and a unit electronic processor 306. As described above, the power interface 302 may include a wired connection to an electrical system of the vehicle. Alternatively or in addition, the hand control unit 100 may include an internal power source, such as a battery. As also described above, the communication interface 304 may include an interface to a communication network of the vehicle, such as a CAN bus. It should be understood that the communication interface 304 make include one or more wired or wireless connections to one or more networks, vehicle components, or a combination thereof.

The unit electronic processor 306 may include a microprocessor, an application specific integrated circuit, or other suitable electronic device. For example, the unit electronic processor 306 may include a microprocessor configured to execute instructions stored in one or more non-transitory computer-readable storage mediums. As illustrated in FIG. 3, the unit electronic processor 306 also communicates with the one or more user-actuated devices 102. During operation, the unit electronic processor 306 receives power through the power interface 302 and determines a state of one or more of the user-actuated devices 102 (such as whether each device 102 is open or closed or in one of a plurality of possible positions). The unit electronic processor 306 may store the state of the devices 102 and, alternatively or in addition, may communicate the state of the devices 102 through the communication interface 304.

As illustrated in FIG. 3, the hand control unit 100 also includes a control unit antenna coil 308. The unit electronic processor 306 (or a separate device included in the hand control unit 100) is electrically coupled to the control unit antenna coil 308 and controls electrical power passed through the control unit antenna coil 308. Optionally, in some embodiments, the hand control unit 100 includes a wireless receiver 310, such as a NFC reader, an RFID reader, or other short-range or long-range wireless receiver, that wirelessly receives data through the control unit antenna coil 308. In some embodiments, the wireless receiver 310 is included in the unit electronic processor 306.

When electrical power is supplied through the control unit antenna coil 308, a magnetic field 312 is generated. As illustrated in FIG. 3, an accessory antenna coil 320 included in the accessory switch pack 200 is positioned within the magnetic field 312, such that the magnetic field 312 induces electrical current in the accessory antenna coil 320. A wireless transmitter 322 included in the accessory switch pack 200 is electrically coupled to the accessory antenna coil 320 and receives the induced electrical current, which powers the wireless transmitter 322. In some embodiments, the wireless transmitter 322 includes a passive NFC transmitter or transponder, a passive RFID tag, or other short-range wireless transmitter. It should also be understood that, in some embodiments, the accessory switch pack includes an accessory electronic processor separate from or combined with the wireless transmitter 322. Similar to the unit electronic processor 306, the accessory electronic processor may include a microprocessor, an application specific integrated circuit, or other suitable electronic device and may be configured to receive the induced electrical current and perform all or a portion of the functionality described herein as being performed by the wireless transmitter 322.

The wireless transmitter 322 is also electronically coupled to the one or more user-actuated devices 202 included in the accessory switch pack 200. During operation, the wireless transmitter 322 receives power through the accessory antenna coil 320 and determines a state of one or more of the user-actuated devices 202 (such as whether each device 202 is open or closed or in one of a plurality of possible positions). The wireless transmitter 322 may store the state of the devices 202 and, alternatively or in addition, may communicate the state of the devices 202. For example, in some embodiments, the wireless transmitter 322 may wirelessly transmit the state of one or more of the user-actuated devices 202 included in the accessory switch pack 200 to one or more external wireless receivers. Accordingly, the accessory switch pack 200 does not require any wired connections with any component of the vehicle because the accessory switch pack 200 receives the induced electrical current from the hand control unit and uses the received induced electrical current to wirelessly transmit data regarding the state of the user-actuated devices 202.

As noted above, in some embodiments, the hand control unit 100 may include a wireless receiver 310 that is configured to wirelessly receive data (via the control unit antenna coil 308) transmitted by the accessory switch pack 200. The hand control unit 100 (the unit electronic processor 306) may communicate the received data as described above with respect to the state of the user-actuated devices 102 included in the hand control unit 100. For example, the hand control unit 100 may communicate data wirelessly received from the accessory switch pack 200 through the communication interface 304 over a vehicle network, such as a CAN bus, or directly to a vehicle component over a wired or wireless connection. Thus, in this embodiment, the hand control unit 100 wirelessly provides power to the accessory switch pack 200 and also wirelessly receives data from the accessory switch pack 200. In other embodiments, the accessory switch pack 200 may wirelessly receive power from the hand control unit 100 but may wirelessly transmit data to a separate external vehicle component.

Figure 4:
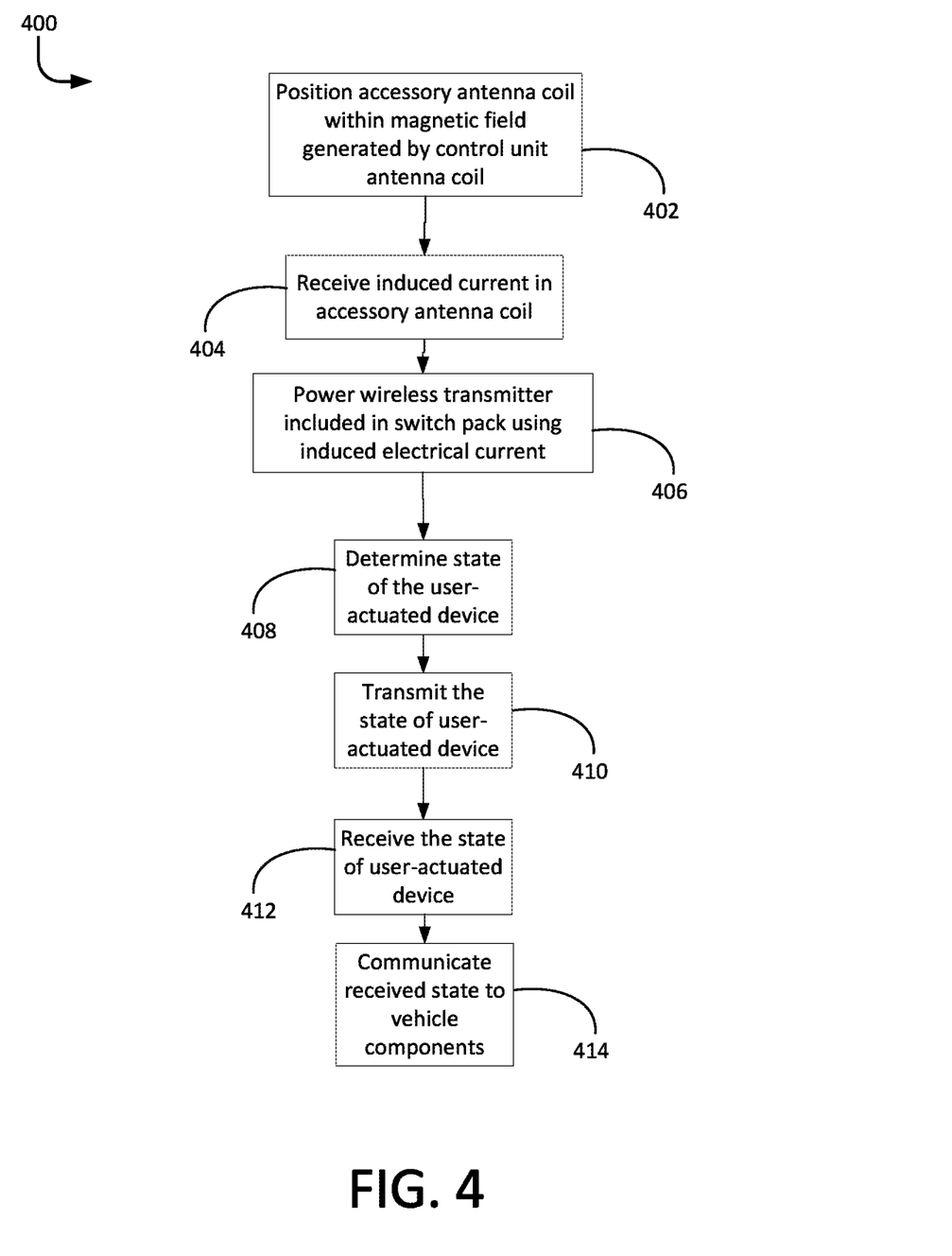
FIG. 4 is a flowchart illustrating a method of controlling a function through a user-actuated device included in the accessory switch pack of FIG. 2 according to one embodiment of the invention.

For example, FIG. 4 is a flowchart illustrating a method 400 of determining a state of a user-actuated device of the accessory switch pack 200. The method 400 includes positioning the accessory antenna coil 320 of the accessory switch pack 200 in a magnetic field 312 generated by the control unit antenna coil 308 included in the hand control unit 100 (at block 402). As described above, in some embodiments, the accessory switch pack 200 may be mechanically coupled to the hand control unit 100 to position the accessory antenna coil 320 within the magnetic field 312. However, in other embodiments, the accessory switch pack 200 may not be mechanically coupled to the hand control unit 100 (or any component of the vehicle) but may be positioned by an operator or passenger of the vehicle within a predetermined distance of the hand control unit 100, such as within approximately 20 centimeters.

When the accessory antenna coil 320 is positioned within the magnetic field 312, the accessory antenna coil 320 receives an induced electrical current based on the magnetic field 312 (at block 404). The received induced electrical current is used to power the wireless transmitter 322 (at block 406), which determines a state of one or more of the user-actuated devices 202 (at block 408) and transmits the state of the one or more user-actuated devices 202 (at block 410).

As described above, in some embodiments, the wireless receiver 310 included in the hand control unit 100 receives the determined state of the user-actuated devices 202 from the wireless transmitter 322 through the control unit antenna coil 308 (at block 412), and the unit electronic processor 306 optionally communicates the received determine state to one or more vehicle components as described above (at block 414). In some embodiments, before communicating the received determined state, the unit electronic processor 306 may process the data received from the accessory switch pack 200. For example, the unit electronic processor 306 may translate or format the data received from the accessory switch pack 200 into a command for a particular vehicle component, such as turn on headlights or turn off headlights.

In some embodiments, the unit electronic processor 306 may also associate data received from the accessory switch pack 200 for a particular user-actuated device 202 with an assigned function. For example, the hand control unit 100 may store assignments of user-actuated devices 202 (and, optionally, device 102) for particular functions. In particular, when the accessory switch pack 200 includes two devices 202, a first user-actuated device may be associated with adaptive headlights and a second user-actuated device may be associated with vehicle high beams. Thus, when the unit electronic processor 306 wireless receives data from the accessory switch pack 200 indicating that the first user-actuated device is open and the second device is closed, the unit electronic processor 306 may use stored assignments to identify that the adaptive headlights should be turned off and the high beams should be turned on and may generate associated commands for communication via the communication interface 304. In some embodiments, the assignments applied by the unit electronic processor 306 may be programmed through the hand control unit 100 or another device that communicates with the hand control unit 100. For example, a device installed in the vehicle, such as a user interface or touchscreen, may allow an operator or passenger to assign functions to the user-actuated devices 102, 202, or both and the assignments may be communicated to the hand control unit 100 through the communication interface 304. Alternatively or in addition, the assignments may be configured through a device carried by the operator or passenger of the vehicle, such as a smart phone, tablet, smart watch, or other personal communication device, that communicates with the hand control unit 100 over a wired connection (a universal serial bus cable), a wireless connection (Bluetooth), or both.

Similarly, in some embodiments, the wireless transmitter 322 may be configured to store (for example, in an internal or external non-transitory computer-readable medium)

assignments for one or more of the user-actuated devices 202. In these embodiments, the wireless transmitter 322 may be configured to wirelessly transmit both the determined state of a user-actuated device 202 and the associated functionality. For example, when a first user-actuated device is open and assigned to control a seat heater and a second user-actuated device is closed and assigned to control a push-to-talk function, the wireless transmitter 322 may be configured to transmit both the state of each device 202 and the associated functionality to the hand control unit 100 or other external device as described above. When the assigned functions are stored and managed by the wireless transmitter 322, the assigned functions may be configured through the hand control unit 100 as described above or may be directly configured to through the wireless transmitter 322. For example, an external device, such as a smartphone, tablet, smart watch, and the like, may communicate with the wireless transmitter 322 to assign the functions. In particular, as noted above, the wireless transmitter 322 may include a transponder, such as a NFC transponder, that allows the wireless transmitter 322 to both transmit and receive radio signals. Accordingly, in this configuration a software application executed by the external device may generate and display one more user interfaces that allow a user to manually configure the assigned functions. The assigned functions may then be transmitted to the wireless transmitter 322 and stored for later use as described above.

Figure 5:
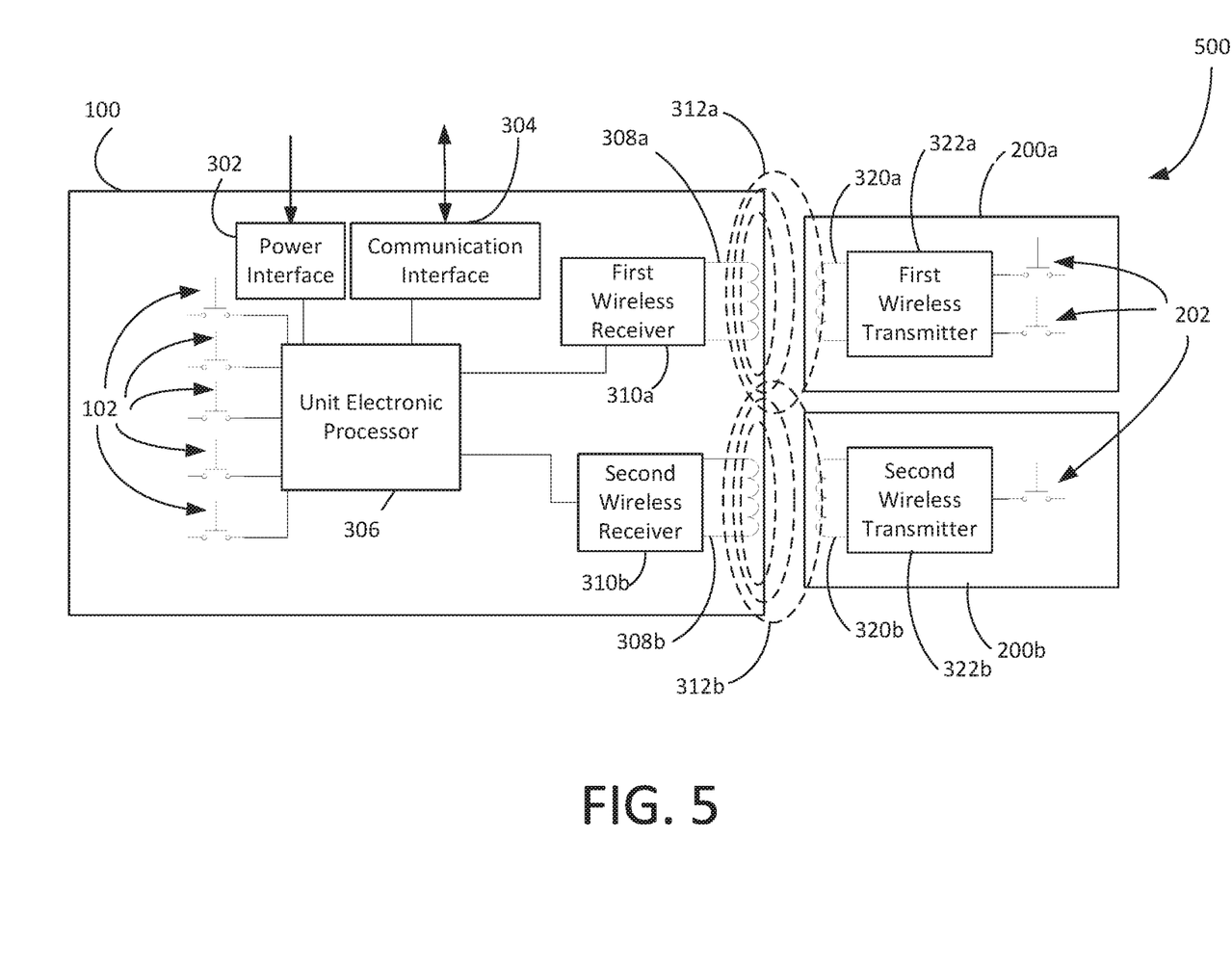
FIG. 5 schematically illustrates the hand control unit of FIG. 1 and multiple accessory switch packs forming a switch system according to another embodiment of the invention.

In some implementations, more than one accessory switch pack 200 may receive induced electrical current from the hand control unit 100. For example, FIG. 5 schematically illustrates a switch system 500 that includes the hand control unit 100, a first accessory switch pack 200a, and a second accessory switch pack 200b. The first and second accessory switch packs 200a and 200b may include similar components as the accessory switch pack 200 described above, and, in some embodiments, the first and second accessory switch packs 200a and 200b include the same number and type of user-actuated devices 202 or a different number or type of user-actuated devices 202.

As illustrated in FIG. 5, to communicate with the first and second accessory switch packs 200a and 200b, the hand control unit 100 includes a first control unit antenna coil 308a and a second control unit antenna coil 308b. The first control unit antenna coil 308a generates a magnetic field 312a that induces an electrical current within the accessory antenna coil 320a electrically coupled to a first wireless transmitter 322a of the first accessory switch pack 200a, and the second control unit antenna coil 308b generates a magnetic field 312b that induces an electrical current within the accessory antenna coil 320b electrically coupled to a second wireless transmitter 322b of the second accessory switch pack 200b. In some embodiments, the hand control unit 100 also includes a first wireless receiver 310a and a second wireless receiver 310b associated with the first and second control unit antenna coils 308a and 308b, respectively. In other embodiments, a single wireless receiver 310 may communicate with both of the first and second control unit antenna coils 308a and 308b. Using the separate coils 308a and 308b allows for simultaneous power transmission and communication with the first and second accessory switch packs 200a and 200b as well as selective power transmission and communication with the first and second accessory switch packs 200a and 200b. It should be understood that, in some embodiments, more than two accessory switch packs 200 may receive induced electrical current from the hand control unit 100 and the configuration illustrated in FIG. 5 is provided as one example of a multiple-pack configuration.

It should also be understood that the hand control unit 100 and accessory switch packs 200 described herein represent one example of such devices and, in some embodiments, the devices may include additional or fewer components in different configurations than as illustrated and described herein. For example, in some embodiments, the hand control unit 100 may not include the user-actuated devices 102. Accordingly, the hand control unit 100 may include any component mounted on the vehicle that has a source of electrical power and, optionally, is positioned in an area accessible to an operator of the vehicle during vehicle operation. Similarly, in some embodiments, the hand control unit 100 includes a user-actuated device (for example, as one of the user-actuated devices 102 or a separate device) that an operator or passenger of the vehicle may operate to control (for example, turn on and turn off) the supply of electrical power through a unit antenna coil. Accordingly, in this configuration, when an accessory switch pack 200 is not present or is not being used, power supply to the unit antenna coil may be stopped to prevent energy waste. Alternatively or in addition, the hand control unit 100 may include a device for controlling the supply of electrical power through a unit antenna coil that is mechanically activated when the accessory switch pack 200 is mounted to the hand control unit 100. Also, in some embodiments, the accessory switch pack 200 includes an energy storage device, such as a capacitor, a battery, and the like. The accessory switch pack 200 may store excess electrical current available through the accessory antenna coil 320 to the energy storage device and may use the stored energy when the electrical current is not induced in the accessory antenna coil or is insufficient to power to the wireless transmitter 322. Furthermore, in some embodiments, the accessory switch pack 200 may include one or more indicators, such as a light emitting diode, that turn on when the accessory switch pack 200 is receiving the induced electrical current. An operator or passenger of the vehicle may use the indicator to identify whether the accessory switch pack 200 is receiving induced electrical current or whether the hand control unit 100 or the accessory switch pack 200 needs to be adjusted (for example, moving the accessory switch pack 200 closer to the hand control unit).

Thus, embodiments of the invention provide a wireless accessory switch pack that receives induced power from a vehicle component wired to an electrical system of the vehicle and uses the received induced power to wirelessly communicate the state of at least one user-actuated device included in the pack. In this configuration, the accessory switch pack does not need to be hardwired to the vehicle (or even mechanically mounted to the vehicle) to receive power or communicate with other vehicle components or non-vehicle components, such as smartphones, media players, and navigation devices. It should be understood that the accessory switch pack is not limited to providing a user-actuated device for controlling a function considered an "accessory" functions. Rather, the accessory switch pack can provide one or more user-actuated device for controlling any type of vehicle or non-vehicle function.

Various features and advantages of the invention are set forth in the following claims.

What is claimed is:

1. A system for a vehicle, the system comprising:
a control unit mechanically coupled to the vehicle, the control unit including
a first antenna coil electrically coupled to an electrical system of the vehicle, the first antenna coil receiving a current from the electrical system and producing a magnetic field; and
a switch pack, the switch pack including
a second antenna coil positioned within the magnetic field and receiving an induced electrical current from the magnetic field,
at least one user-actuated device, and
a wireless transmitter electrically coupled to the second antenna coil, the wireless transmitter configured to
receive the induced electrical current from the second antenna coil,
use the induced electrical current to determine a state of the at least one user-actuated device, the state of the at least one user-actuated device including one of a plurality of states including at least a first state and a second state, and
use the induced electrical current to wirelessly transmit the state of the at least one user-actuated device, the wireless transmitter transmitting a first signal in response to the user-actuated device being in the first state and transmitting a second signal in response to the user-actuated device being in the second state.

2. The system of claim 1, wherein the control unit includes a wireless receiver configured to receive the state of the at least one user-actuated device from the wireless transmitter.

3. The system of claim 2, wherein the first antenna coil is coupled to the wireless receiver.

4. The system of claim 2, wherein the wireless receiver includes a near field communication reader.

5. The system of claim 2, wherein the control unit further includes a communication interface communicating with a controller area network (CAN) bus of the vehicle, wherein the communication interface communicates the state of the at least one user-actuated device over the CAN bus.

6. The system of claim 1, wherein the wireless transmitter includes a passive near field communication transponder.

7. The system of claim 1, wherein the wireless transmitter is further configured to use the induced electrical current to wirelessly transmit a function assigned to the at least one user-actuated device.

8. The system of claim 7, wherein the wireless transmitter is further configured to receive the function assigned to the at least one user-actuated device.

9. The system of claim 1, wherein the wireless transmitter is a near field communication transponder.

10. The system of claim 1, wherein the control unit further includes a user-actuated device for controlling the current from the electrical system to the first antenna coil.

11. The system of claim 1, wherein the switch pack further includes a mounting mechanism for mechanically coupling the switch pack to the control unit.

12. A switch pack for a vehicle, the switch pack comprising:
a first antenna coil positioned within a magnetic field produced by a second antenna coil electrically coupled to an electrical system of the vehicle and receiving an induced electrical current from the magnetic field;
at least one user-actuated device; and
a wireless transmitter electrically coupled to the first antenna coil, the wireless transmitter configured to
receive the induced electrical current from the first antenna coil,
use the induced electrical current to determine a state of the at least one user-actuated device, the state of the at least one user-actuated device including one of a plurality of states including at least a first state and a second state, and
use the induced electrical current to wirelessly transmit the state of the at least one user-actuated device, the wireless transmitter transmitting a first signal in response to the user-actuated device being in the first state and transmitting a second signal in response to the user-activated device being in the second state.

13. The switch pack of claim 12, wherein the wireless transmitter wirelessly transmits the state of the at least one user-actuated device to a wireless receiver coupled to the second antenna coil.

14. The switch pack of claim 13, wherein the wireless transmitter includes a passive near field communication transponder.

15. The switch pack of claim 12, wherein the wireless transmitter is further configured to use the induced electrical current to wirelessly transmit a function assigned to the at least one user-actuated device.

16. The switch pack of claim 15, wherein the wireless transmitter is further configured to receive the function assigned to the at least one user-actuated device.

17. The switch pack of claim 12, further comprising a mounting mechanism for mechanically coupling the switch pack to a control unit including the second antenna coil.

18. A method of controlling a function through a user-actuated device included in a switch pack, the method comprising:
positioning a first antenna coil included in the switch pack in a magnetic field generated by a second antenna coil electrically coupled to an electrical system of a vehicle;
receiving an induced electrical current in the first antenna coil based on the magnetic field;
powering a wireless transmitter included in the switch pack using the induced electrical current;
determining a state of the user-actuated device, the state of the at least one user-actuated device including one of a plurality of states including at least a first state and a second state; and
transmitting the state of the user-actuated device via the wireless transmitter by transmitting a first signal in response to the user-actuated device being in the first state and transmitting a second signal in response to the user-activated device being in the second state.

19. The method of claim 18, further comprising
receiving the state of the user-actuated device via a wireless receiver coupled to the second antenna coil.

20. The method of claim 18, wherein transmitting the state of the user-actuated device includes transmitting the state of the user-actuated device via a near field communication transponder.

* * * * *